(No Model.) 8 Sheets—Sheet 1.
E. B. PRESTON.
TURN TABLE EXTENSION LADDER TRUCK.
No. 414,578. Patented Nov. 5, 1889.
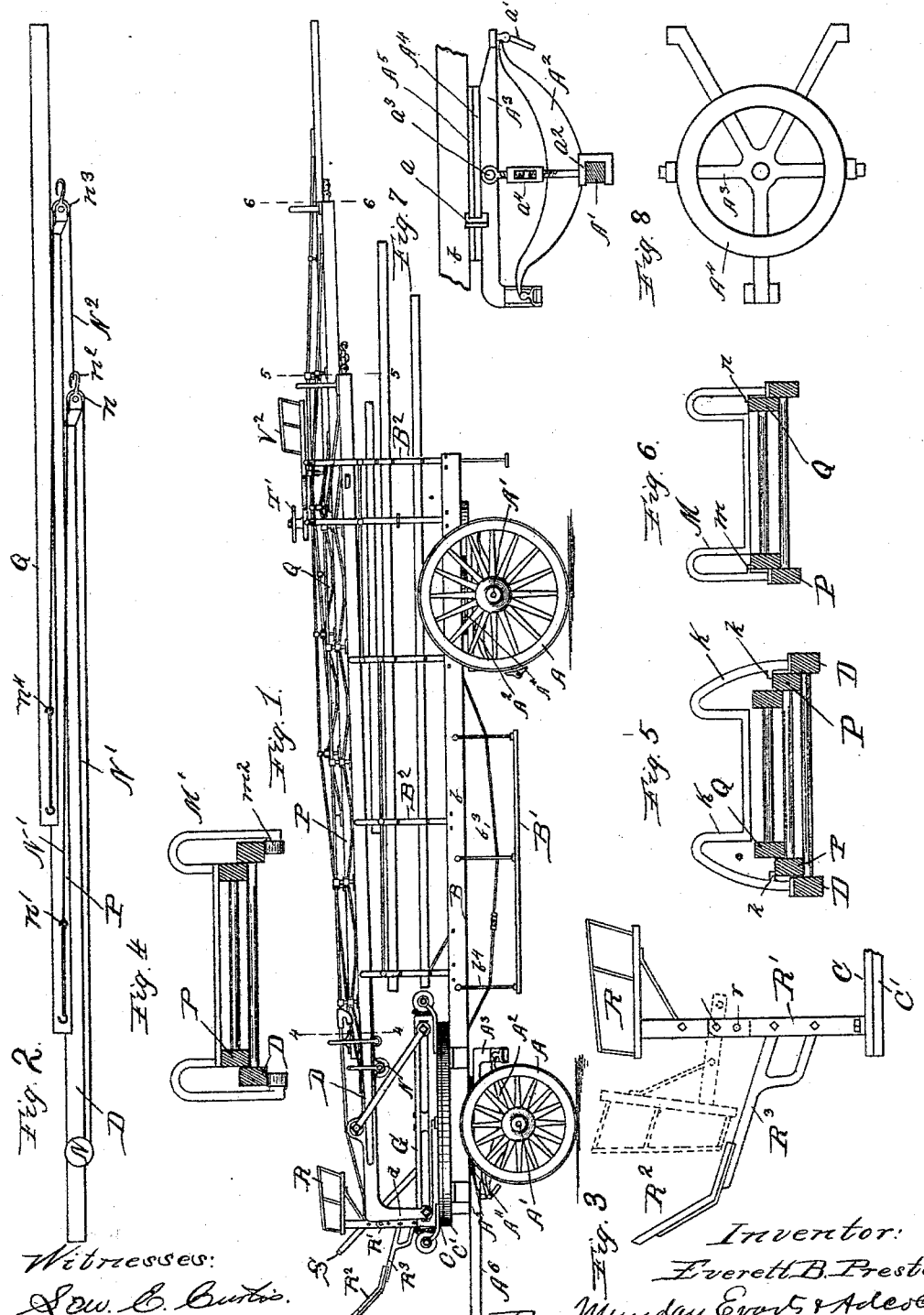
Witnesses:
Geo. E. Curtis.
H. M. Munday.
Inventor:
Everett B. Preston
By Munday, Evarts & Adcock
his Attorneys.

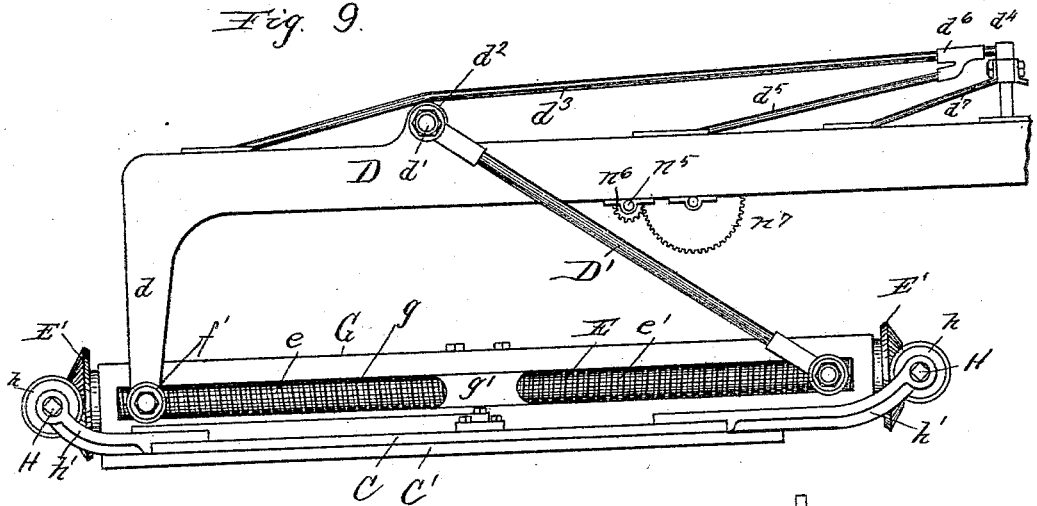
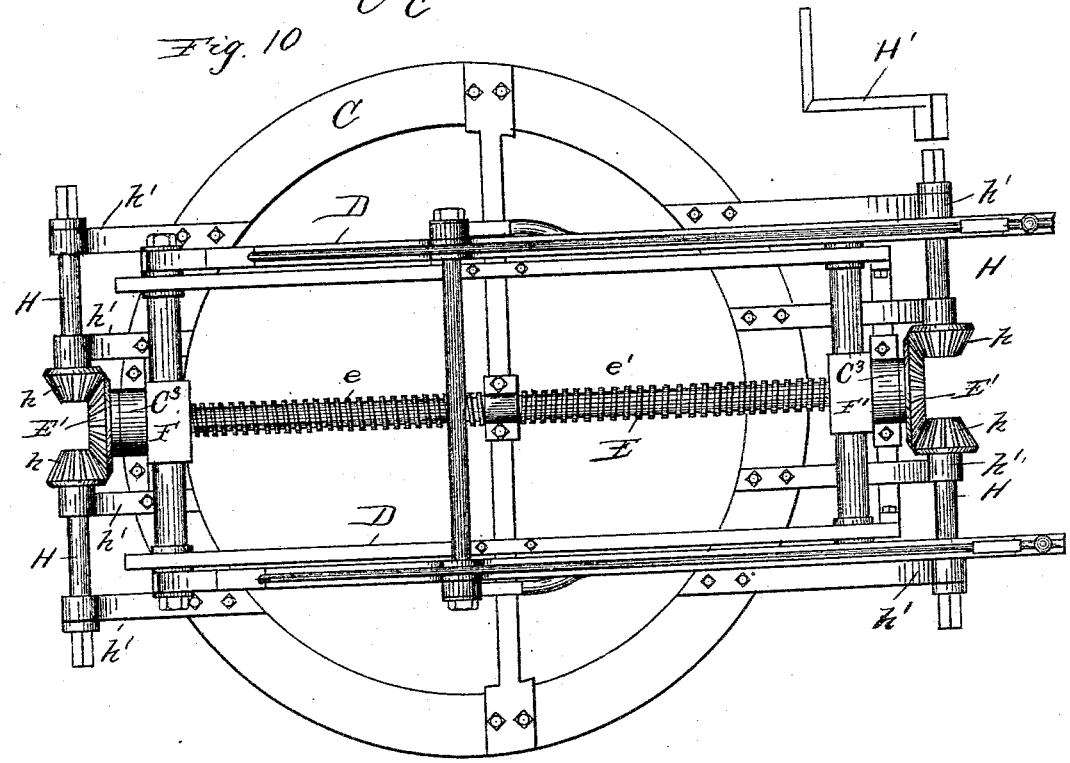

(No Model.) 8 Sheets—Sheet 3.
E. B. PRESTON.
TURN TABLE EXTENSION LADDER TRUCK.
No. 414,578. Patented Nov. 5, 1889.
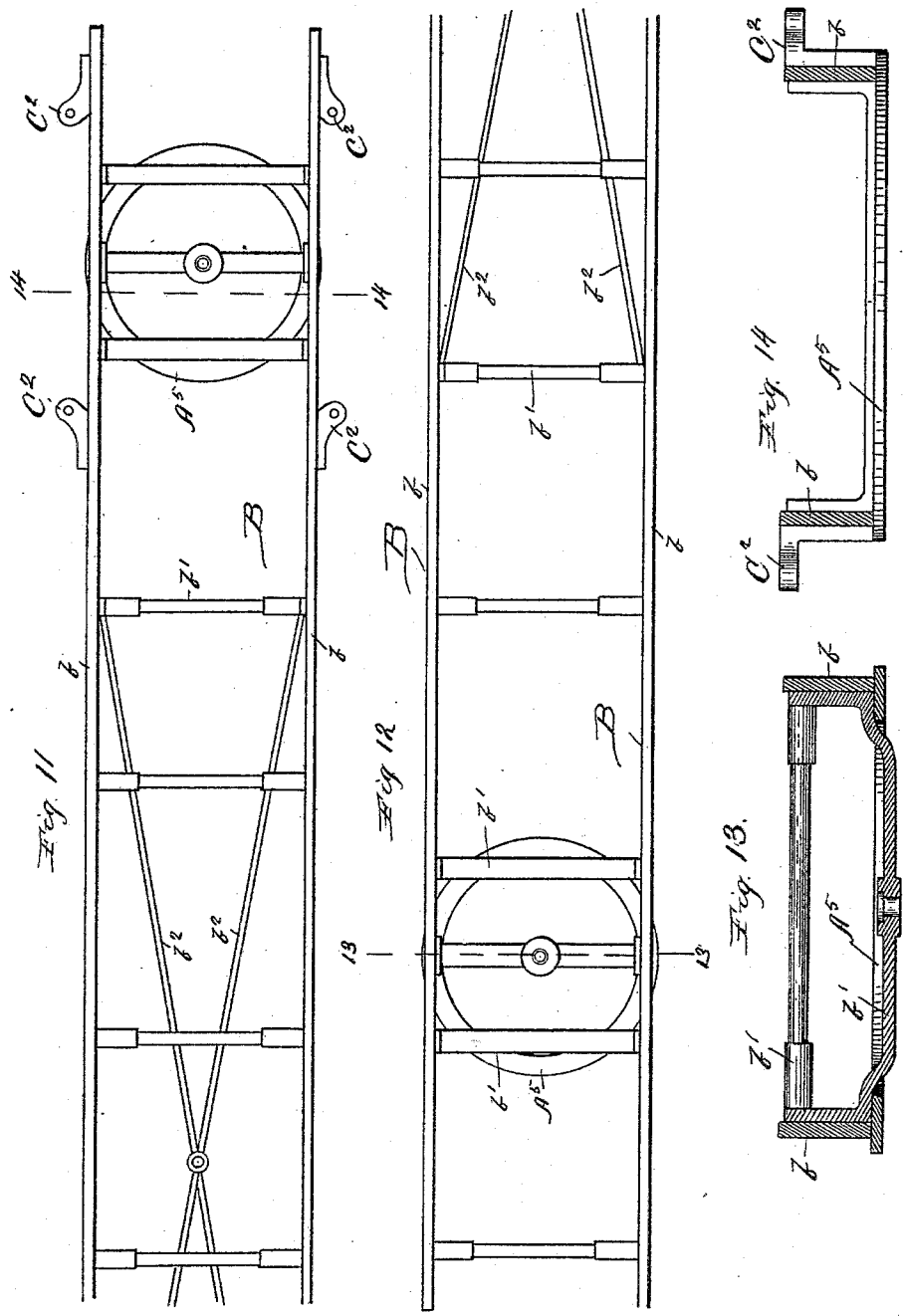

(No Model.) 8 Sheets—Sheet 4.
E. B. PRESTON.
TURN TABLE EXTENSION LADDER TRUCK.
No. 414,578. Patented Nov. 5, 1889.
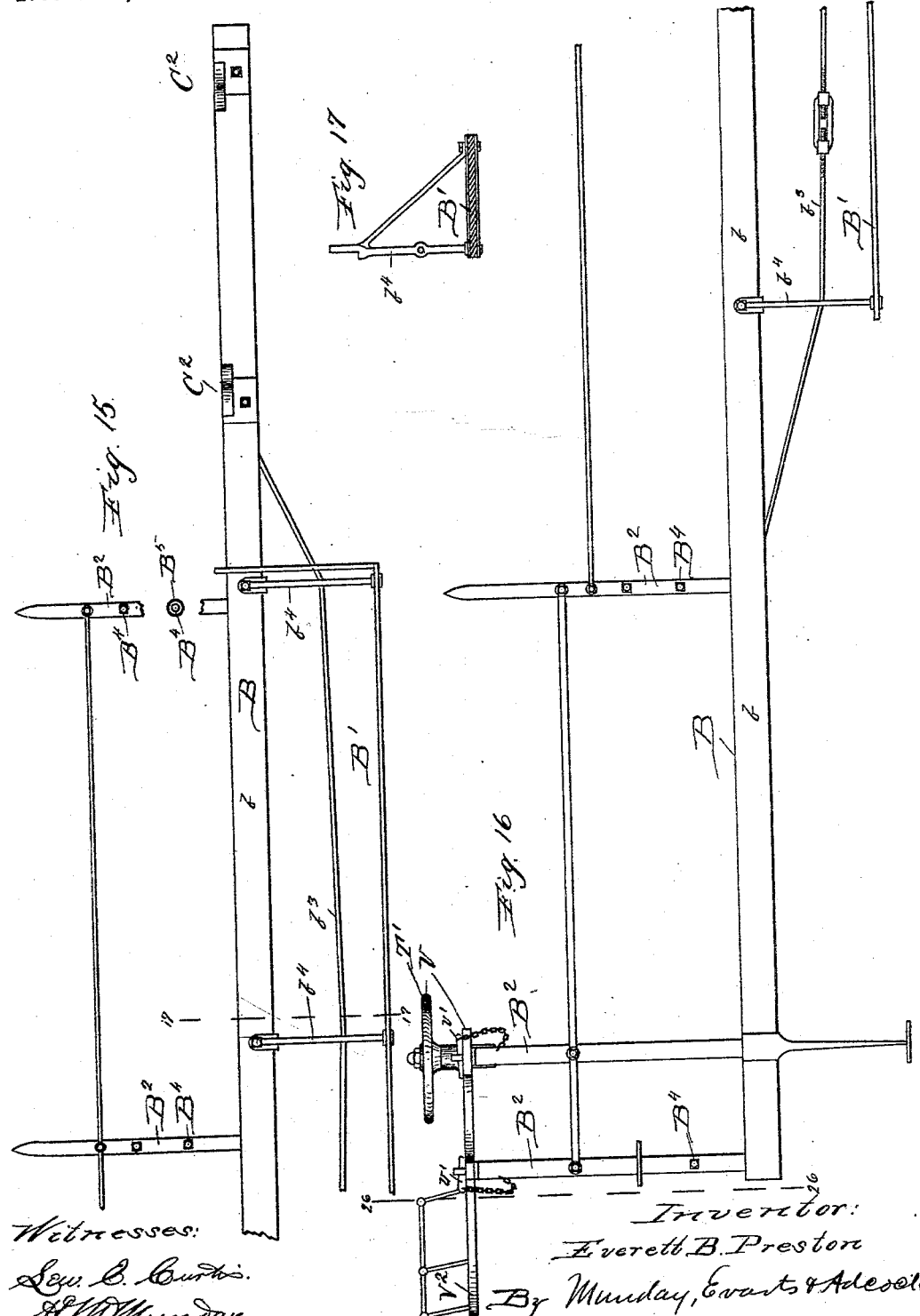

(No Model.) 8 Sheets—Sheet 5.
E. B. PRESTON.
TURN TABLE EXTENSION LADDER TRUCK.
No. 414,578. Patented Nov. 5, 1889.
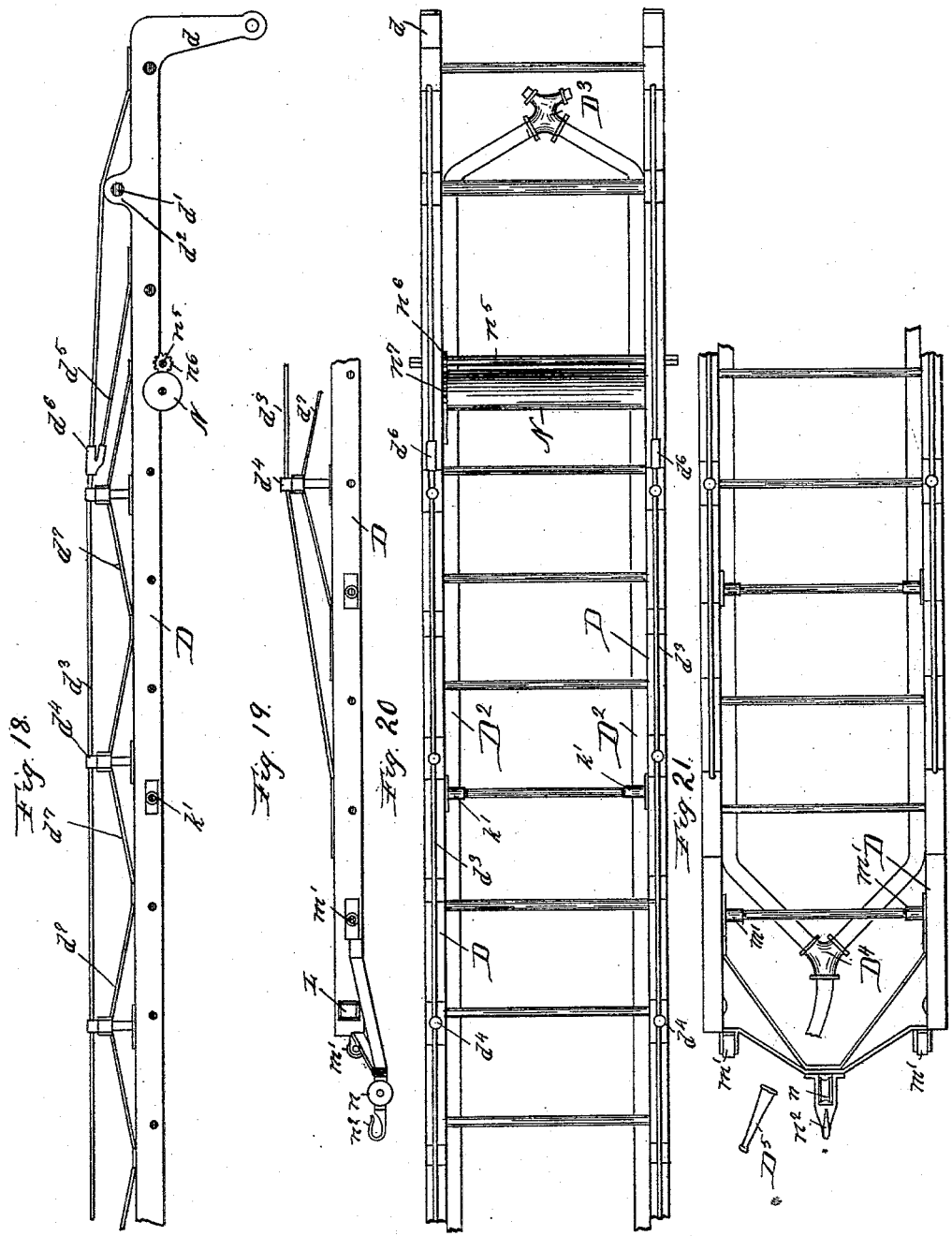

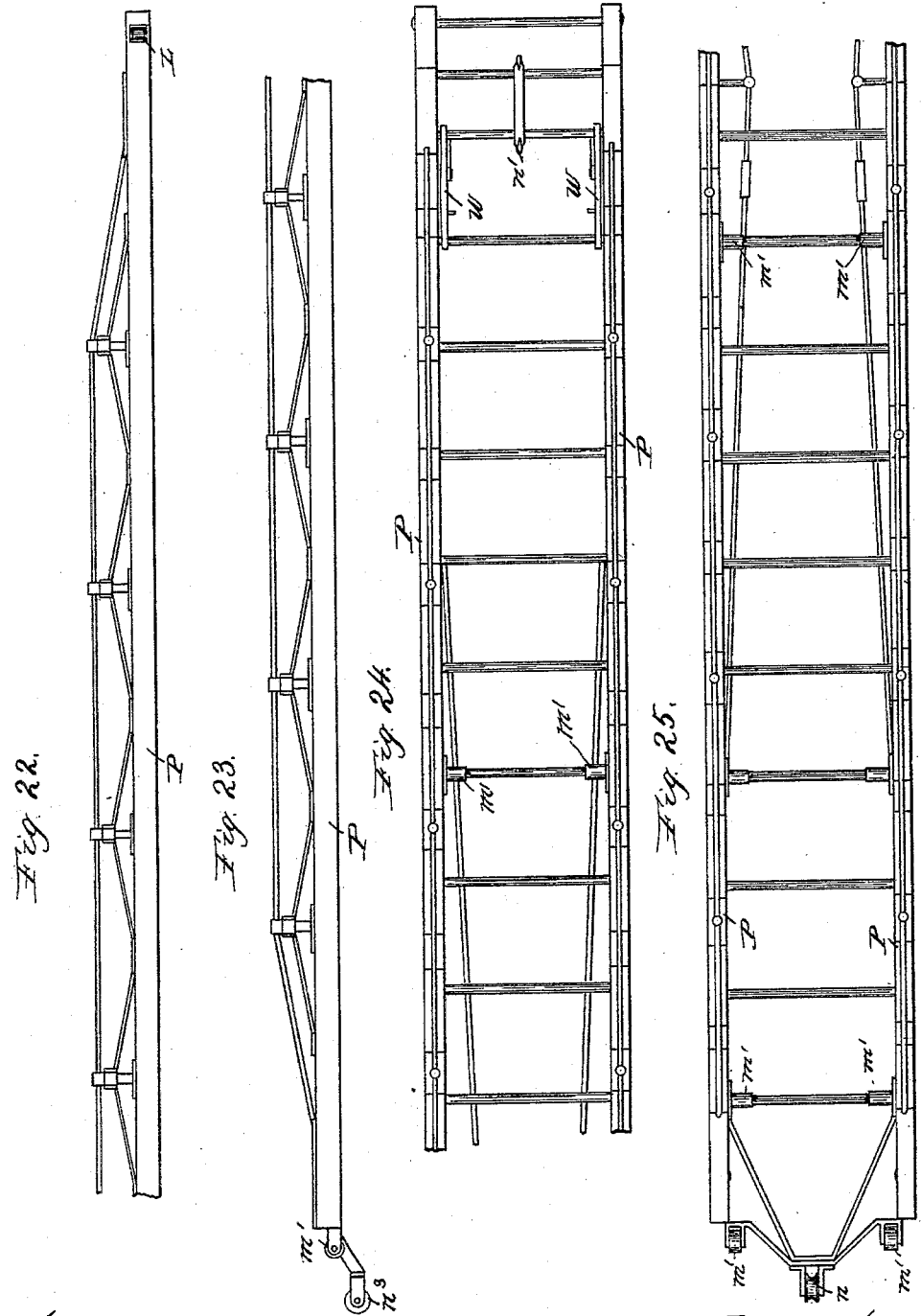

(No Model.) 8 Sheets—Sheet 7.
E. B. PRESTON.
TURN TABLE EXTENSION LADDER TRUCK.
No. 414,578. Patented Nov. 5, 1889.
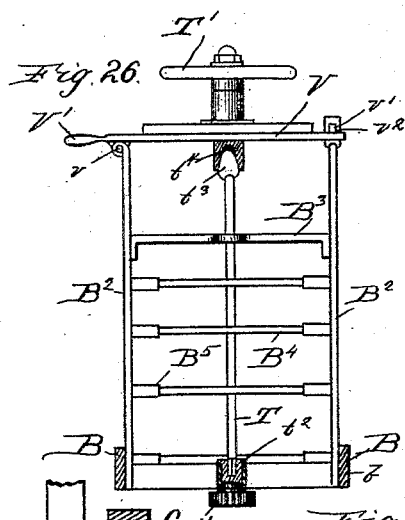
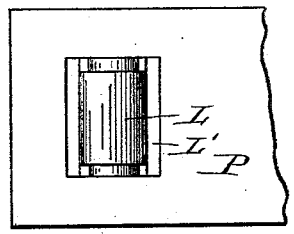
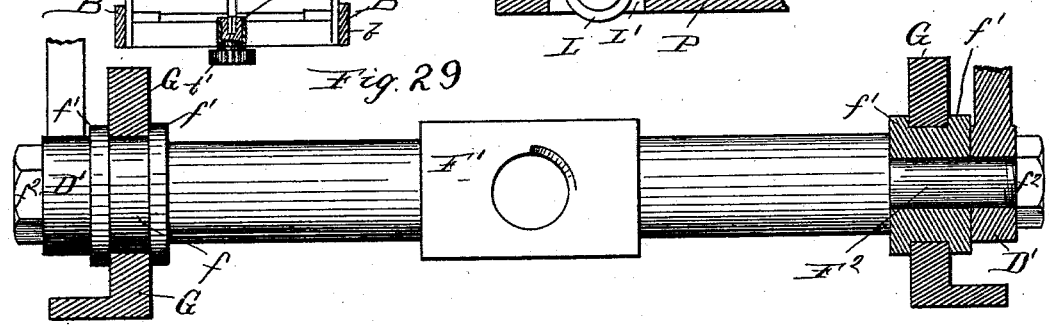
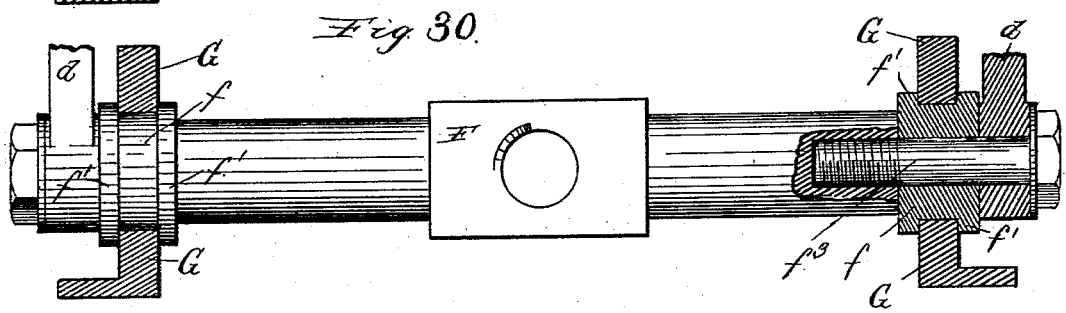
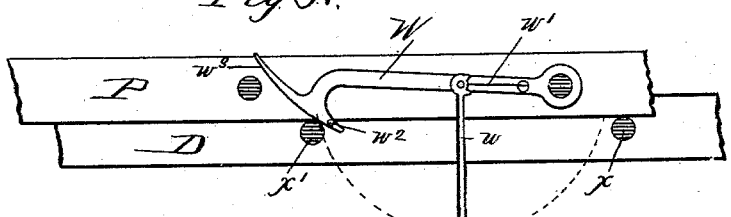
Witnesses:
Geo. C. Curtis
H. M. Munday
Inventor:
Everett B. Preston
By Munday, Evarts & Adcock
His Attorneys (No Model.) 8 Sheets—Sheet 8.
E. B. PRESTON.
TURN TABLE EXTENSION LADDER TRUCK.
No. 414,578. Patented Nov. 5, 1889.
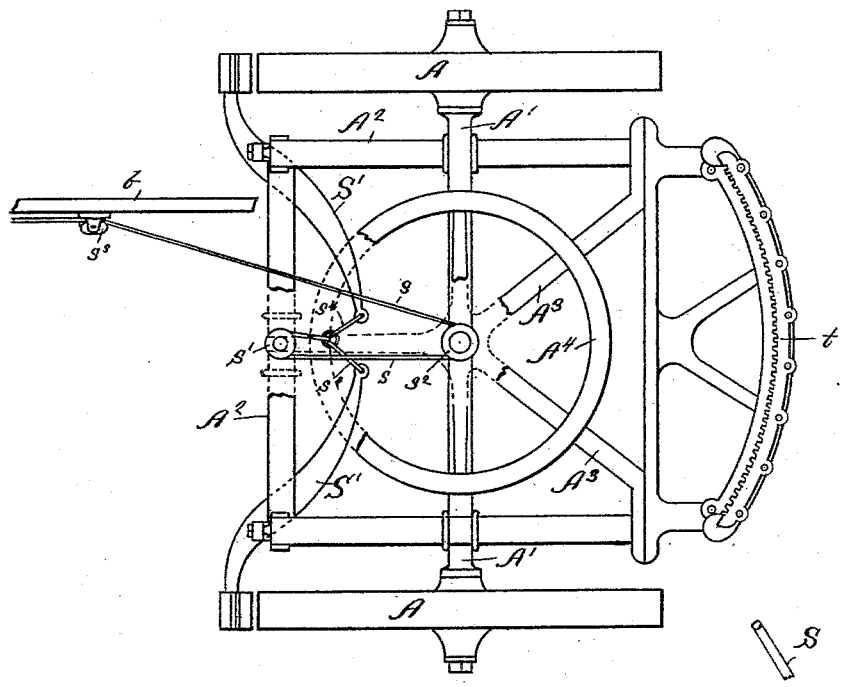
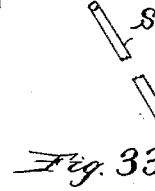
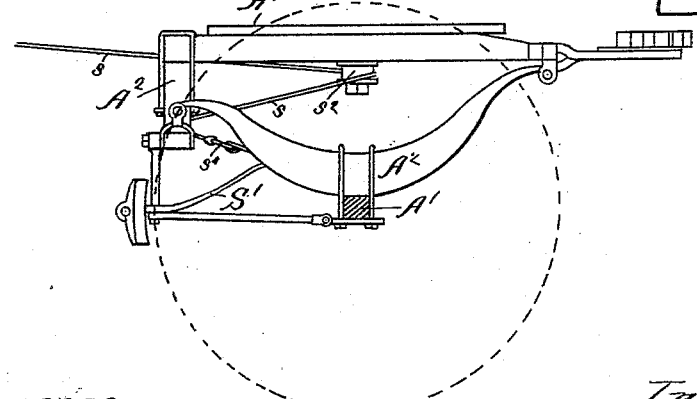

UNITED STATES PATENT OFFICE.

EVERETT B. PRESTON, OF CHICAGO, ILLINOIS.

TURN-TABLE EXTENSION-LADDER TRUCK.

SPECIFICATION forming part of Letters Patent No. 414,578, dated November 5, 1889.

Application filed March 25, 1889. Serial No. 304,747. (No model.)

*To all whom it may concern:*

Be it known that I, EVERETT B. PRESTON, a citizen of the United States, residing in Chicago, in the county of Cook and State of Illinois, have invented a new and useful Improvement in Turn-Table Extension-Ladder Trucks, of which the following is a specification.

My invention relates to extension-ladders mounted upon wheeled trucks and designed for use by fire-departments in cities.

The object of my invention is to provide an extension-ladder truck of a simple, efficient, and durable construction, which may be quickly raised and extended, and which when raised may be turned or directed to any point or part of a building desired, and the raising mechanism of which may be operated in whatever position the ladder may be turned in relation to the truck.

In my invention the ladder is pivotally supported upon a turn-table mounted upon a truck. Three ladders are employed, one sliding or telescoping upon another and combined with suitable mechanism for extending them. The main ladder, which is pivotally supported on the turn-table, is raised to any desired elevation or inclination by a screw. This screw has right and left hand threads, and is furnished with two nuts or threaded bars, to one of which the main ladder is pivoted and to the other of which is pivoted a connecting-link, so that as the two nuts or threaded bars approach each other by revolving the screw the ladder will be raised. The screw is furnished with a beveled gear at each end, which mesh with bevel-gears on crank-shafts extending out each side of the truck in convenient position for operation in whatever position the turn-table may be turned in respect to the truck-frame. The screw serves not only to raise the ladder, but to hold it in any position desired for use. The extension-ladders are furnished with friction-rollers, so that they may slide easily on each other.

My invention consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation of a turn-table extension-fire-ladder truck embodying my invention. Fig. 2 is a detail or diagram view showing the rope or tackling connecting the main ladder and the two extension-ladders. Fig. 3 is an enlarged detail view showing the driver's seat thrown forward in the dotted lines in position for raising the ladder. Figs. 4, 5, and 6 are enlarged cross-sections on lines 4 4, 5 5, and 6 6, respectively, of Fig. 1. Fig. 7 is a detail side elevation of the fifth-wheel and turn-table and springs, showing the means for clamping or securing the fifth-wheel rigidly to the front axle of the truck. Fig. 8 is a plan view of the truck. Fig. 9 is an enlarged side elevation showing the mechanism for raising the main ladder, and Fig. 10 is a plan view of the same. Figs. 11 and 12 together show a plan view of the truck-frame, the former showing the front half and the latter the rear half of the same. Figs. 13 and 14 are enlarged cross-sections on lines 13 13 and 14 14 of Figs. 11 and 12, respectively. Figs. 15 and 16 are enlarged side elevations of the front and rear ends, respectively, of the truck-frame. Fig. 17 is a cross-section on line 17 17 of Fig. 15, showing the side step. Figs. 18 and 19 together show a side elevation of the main ladder, the former showing the lower and the latter the upper end of the same. Figs. 20 and 21 together show a plan view of the main ladder, the former being the lower and the latter the upper end of the same. Figs. 22 and 23 together show a side elevation of one of the extension-ladders, the former being the lower and the latter the upper end of the same. Figs. 24 and 25 together show a plan view of one of the extension-ladders. Fig. 26 is a vertical cross-section of the truck-frame, taken on line 26 26 of Fig. 16. Figs. 27 and 28 are enlarged views illustrating the friction-roller for the extension-ladders. Fig. 29 is an enlarged view of the nut or threaded bar at the rear end of the screw, to which the connecting-links are pivoted. Fig. 30 is a similar view of the threaded bar or nut to which the main ladder is pivoted. Fig. 31 is a side elevation showing the latch or safety hook with which the extension-ladders are provided. Fig. 32 is a plan view, showing the brake-connecting mechanism; Fig. 33, a side elevation of the brake-operating lever; Fig. 34, a side elevation of the brake-shoe.

In the drawings, A represents the wheels of the truck; A', the axles; $A^2$, the springs; $A^3$, the spider or frame to which the lower ring $A^4$ of the fifth-wheel $A^5$ is secured.

B is the truck-frame having steel side bars $b$, furnished with cross brace-arms $b'$ and diagonal brace-rods $b^2$. The fifth-wheel rings $A^5$ are rigidly secured to the cross-bars $b'$.

To securely clamp the two rings $A^4$ and $A^5$ of the fifth-wheel together when the ladder is elevated or in use, clips $a$ are provided, as shown in Fig. 7, and to fix the truck-frame B rigidly to the axles A', so that the ladder when raised will not be made to vibrate by the yielding of the springs $A^3$, I provide clips $a^2$, which fit over the axle A' and are pivotally connected at $a^3$ to the spider or frame $A^3$. The clips $a^2$ are furnished with a turn-buckle $a^4$ for tightening them after they are placed on the axle, as shown in Fig. 7. When the ladder is not raised or in use, the swinging clips $a^2$ are supported by a link $a^5$ attached to the spider $A^3$.

The truck-frame B is furnished with truss-rods $b^3$, and also with side steps B', supported on dependent brackets $b^4$. The truck-frame is also provided with vertical standards $B^2$, having cross-bars $B^3$ for strengthening and bracing the same, and upon which the main ladder D rests. The standards $B^2$ are also furnished with rollers or revoluble bars $B^4$, upon which the hand-ladders are supported. The rollers $B^4$ should be furnished with a rubber hose or other similar covering $B^5$, to prevent marring the hand-ladder, as they are pushed or pulled out. By supporting the hand-ladders on revolving bars or rollers I am enabled to remove the hand-ladders from the truck very quickly and easily. The cross-bars $B^3$, which support the main or pivoted ladder are arranged high enough on the standards $B^2$ to give room for as many hand-ladders between the truck-frame and the main ladder as may be desired.

The rear axle A' has the same fifth-wheel connected with the truck-frame as the front axle. The pole or tongue $A^6$ is connected in the usual way to the front axle, and the fifth-wheel of the rear axle is furnished with a steering mechanism, hereinafter described.

The upper ring C of the turn-table, upon which the main ladder D is pivoted, turns on the lower turn-table ring C', which is secured by suitable brackets $C^2$ to the truck-frame B. The movable ring C of the turn-table is furnished with bearings $C^3$, in which the screw E is journaled. The screw E is furnished with right and left hand threads $e$ $e'$, and it has two traveling nuts or threaded bars F F', furnished with friction guide-rollers $f$ at each end, which travel in guide-bars G G, which are rigidly secured to the turn-table C. The guide-bars G have slots $g$, the width of which equals the diameter of the friction-roller $f$, and the friction-rollers $f$ have collars $f'$, which fit on each side of the guide-bars G. The guide-bars G are also furnished at their middle with a stop-block $g'$, against which the friction-rollers $f$ fit when the ladder is raised perpendicular.

The side bars of the ladder D are furnished with bent ends or arms $d$ at the lower extremity of the ladder, and preferably extending about at right angles to the ladder, so that when the ladder is raised to the vertical position these arms $d$ may rest flat upon the turn-table C, and thus give the ladder greater rigidity in its vertical position. The arms or bent ends $d$ of the ladder are pivoted to the threaded bar or nut F, the same fitting outside the friction-roller $f$. The threaded bar or nut F' at the opposite end of the right and left hand screw G is connected to the ladder through the pivoted links D', one end of these links being pivoted to the ladder at $d'$ by the pivot-bar $d^2$, and the other end of the links D' being pivoted to the threaded bar F'. The links D' fit outside of the side bars of the ladder. By turning the screw E the nuts F F' will approach each other, and the ladder will be raised from a horizontal position to any desired inclination. The threaded bar F' may be simply turned down at each end to form a spindle $F^2$ for the friction wheels or rollers $f$ and for the connecting-links D'. A nut $f^2$ secures the links D' in place. As the side bars of the ladder D are rigidly framed together, so that the threaded bar F could not be thus put in place between them, I provide the nut F with removable threaded spindles $f^3$, which may be inserted through the side bars of the ladder and the friction-roller $f$, and then screwed into the threaded bar F, as shown in Fig. 30.

The screw E is furnished at each end with bevel-gears E', which mesh with bevel-gears $h$ on the crank-shafts H H H H, which extend out laterally at right angles to the screw in convenient position for the firemen to operate the same by the cranks H'. The cranks H' fit removably upon the crank-shafts, so that when not in use they may be hung in place on the truck-frame. The crank-shafts H are journaled on suitable brackets $h'$, secured to the turn-table C. The main ladder D is furnished with a main truss-rod $d^3$, supported on suitable struts $d^4$. The truss-rod $d^3$ extends from one end of the main ladder to the other, and at the lower end of the ladder it is furnished with a branch $d^5$, connected thereto by a coupling $d^6$. The main ladder is also provided with a series of brace or truss rods $d^7$, extended between each pair of struts $d^4$, as is clearly shown in Fig. 18. The main ladder D is further provided with pipes $D^2$, preferably of brass, extending along each side rail under the rungs of the ladder. These pipes are connected together at each end of the ladder branches $D^3 D^4$. These pipes may be connected at the top to a nozzle $D^5$ or to a length of flexible hose which may be carried by the firemen to any desired height on the extension-ladders P and Q. The apparatus thus serves not only as an aerial ladder, but also as a stand-pipe for conveying the water to a height and directing the stream. The same mechanism which serves to raise the ladder to any desired inclination for use and to turn or direct it to any part or window of a burning building, as may be required from time to time, also serves to elevate and direct the stand-pipes or water-pipes $D^2 D^2$.

The main ladder D, which is pivoted on the turn-table, is furnished with cross arms or guides K at intervals, having projections $k$, which fit over the side bars of the extension-ladder P. The side bars of the ladder P fit between these guide projections $k$ and the friction rollers or wheels $k'$ on the main ladder D. The friction-rollers $k'$, upon which the side bars of the ladder P ride, may be mounted upon the rungs of the main ladder D, and they serve to materially facilitate the raising or extension of the ladder P. Secured to the extension-ladder P are similar guide-bars M, having projections $m$, which fit over the side bars of the final extension-ladder Q, which ride upon the friction-rollers $m'$, mounted on the rungs of the ladder P.

The two extension-ladders P and Q are simultaneously and equally extended by means of a windlass N, journaled on the main ladder D, near the lower end thereof, and having a cable N' secured thereto, which passes around a pulley $n$ at the top of the main ladder, and which is secured to the extension-ladder P by a hook $n'$ near the lower end thereof. The movement of the extension-ladder P on the main ladder D simultaneously extends the fly-ladder Q on the ladder P by means of a cable $N^2$, connected at one end by a hook $n^2$ to the main ladder D, and passing around a pulley $n^3$ at the top of the ladder P, and secured at its other end to the ladder Q by a hook $n^4$ near the lower end of said ladder Q. The cables N' and $N^2$ are preferably wire cables, though ordinary ropes or chains may be used. The windlass N is revolved to extend the extension-ladders P and Q by means of a crank-shaft $n^5$, having a gear $n^6$ meshing with a gear $n^7$ on the shaft of the windlass N.

R is the driver's seat, mounted on the turn-table at the front end of the truck. It is pivoted to the standards R' on the turn-table, so that it may be turned down into the position shown in the dotted lines in Fig. 3, and thus be out of the way of the ladder in the raising of the same. A removable pin $r$, which passes through a hole in the standard R' and a similar hole in the leg or shank of the seat, serves to hold the seat in its upright position.

$R^2$ is the foot-rest mounted upon a bracket $R^3$, secured to the standards R'. It will be observed that as the main ladder D is raised the threaded bar F, to which the ladder is pivoted, moves away from the rigid seat-standards R', so that it is not necessary to remove these standards in order to raise the ladder, which is a matter of great convenience as well as saving of time, the latter being frequently of the utmost importance in the practical operation of fire apparatus.

S is the brake-operating lever, which projects in convenient position for operation by the driver. It is connected to the brake-levers S' S' by means of a cable $s$, passing over or around pulleys $s'$, $s^2$, and $s^3$. The cable $s$ is connected to links $s^4$, which are connected to the brake-levers S' S'. This is clearly shown in Figs. 32 and 34.

The rear spider or frame $A^3$, which is connected to the rear axle A', is furnished with a gear $t$, which meshes with a gear $t'$ on the operating rod or shaft T, so that by revolving the shaft T the rear wheels can be turned or steered in any direction desired. The shaft T has a squared end and fits removably in the socket-piece $t^2$, to which the gear $t'$ is rigidly secured. The removable shaft T serves to hold the hand-ladders in place on their racks or supports on the standards $B^2$.

T' is the steering-wheel by which the shaft T is turned. The shaft T has a squared tapering end $t^3$, which fits in a socket $t^4$ on the shaft of the hand-wheel T'. The hand-wheel T' or its shaft is journaled in or on the frame V, pivotally connected at one end at $v$ to the standards $B^2$, so that this frame V may be turned into an upright position when it is desired to raise the ladders. The frame V is secured to the standards B on the opposite sides by a latch-connection or pin $v'$, which passes through a slot $v^2$ in the opposite end of the standards $B^2$. A handle or projection V' on the cross-bars or frame V serves as a stop to hold the frame V in a vertical position when it is turned up out of the way. The steersman's seat $V^2$ is mounted on this same pivotal or swinging frame V, so that the act of swinging the steering-wheel frame out of the way of the ladders also removes the seat $V^2$. The squared end of the steering-shaft T is made tapering, as indicated in Fig. 26, so that the pivotal or swinging frame V on which the steering-wheel T' is journaled will permit the steering-wheel shaft and the shaft T' to properly engage.

To prevent difficulty of extending the extension-ladders P and Q, due to the friction of the side bars of the ladders on each other, I provide the side bars of the ladders D, P, and Q with vertical friction-rollers L L, mounted in suitable recesses L' on the inner face of the side bars of the main ladder D, near the top thereof, and on the outer face of the side bars of the extension-ladder P, near the bottom thereof, and also on the inner face of the side bars of the ladder P, near the top thereof, and on the outer face of the side bars of the ladder Q, near the bottom thereof. This is clearly shown in Figs. 21, 24, 25, 27, and 28. It will be observed from Figs. 4, 5, and 6 that the side faces of the side bars of the ladders D, P, and Q fit against each other, and these friction-rollers L are designed to give the ladders, in connection with the rollers, a free and easy movement on each other, so that they may be raised quickly and easily.

The side bars of the extension-ladders, which abut against the inner faces of the side bars of the main ladder, have heretofore necessarily been made with some considerable play, in order to permit the long extension-ladder to slide with reasonable freedom on the long main ladder, and this play or looseness causes the extension-ladder to vibrate laterally when extended to such a degree as often to endanger the lives of the firemen mounting the ladders. The friction-rollers L L, between the contiguous or meeting side faces of the ladder side bars, serve to take up this lateral play and to render the ladders rigid and free from lateral vibration. The friction-rollers L being countersunk in the side bars permit the side bars to abut directly against each other, the same as heretofore, the periphery of the rollers L projecting just sufficiently to relieve the friction, so that such bars of the extension-ladder will be properly supported by the side bars of the main ladder. By thus countersinking the friction-rollers, as shown, so that they project just sufficiently to relieve the friction between the side bars of the ladders, the side bars, by their mutual support and slight surface contact with each other, are prevented from exerting maximum and breaking strains upon the pivots of the friction-rollers when the side bars are subjected to such lateral flexure as is unavoidable in the use of the ladder. If the friction-rollers projected so far that the side bars of the ladders could not come into immediate contact when subjected to great lateral strain and flexure, the side bars of the one ladder would receive no direct support from those of the other ladder, and the whole lateral strain would come upon the pivots of the friction-rollers, thus endangering their breaking and rendering insecure the structure as a whole.

Each of the extension-ladders P and Q is furnished with safeguard-hooks W, having a pivoted latch $w$, actuated by a spring $w'$. To prevent the hooks from engaging the rungs of the ladder when the extension-ladder is being lowered, the hook W has a projection $w^2$, against which the spring-latch strikes, so as to close the hook. The hook W also has a nose $w^3$ to adapt it to ride over the rungs of the main ladder as the extension-ladder, is raised. To lower the extension-ladder, it is necessary to first raise it slightly into the relative position indicated in Fig. 31, so that the spring-latch $w$ will clear the rung marked $x$ and thus move into the position shown in Fig. 31, care being taken not to raise the extension-ladder high enough to cause the hook W to slip over the rung marked $x'$. These safety-hooks W, engaging the rungs of the lower ladder, serve to support the extension-ladder independently of the cable N' or N² while the ladders are in use and thus render the apparatus more safe and secure.

By employing three ladders D, P, and Q, the two ladders being extended simultaneously, the main ladder D may be made much shorter and consequently can be raised much more easily and quickly by the raising-screw mechanism than can be done where only one extension-ladder is employed.

A guide-bracket M', having a friction-roller $m^2$, as shown in Fig. 4, is secured to the extension-ladder P at the lower end thereof and engages the main ladder D on the inner side thereof to properly secure the ladders together when the ladder P is extended.

I claim—

1. The combination, with a turn-table truck, of slotted guide-bars G, having stop-locks $g'$ at the middle thereof, right-and-left-hand screw E, nut-bars F F', and links D', substantially as specified.

2. The combination, with a turn-table truck, of a right-and-left screw E, traveling nut-bars F F', ladder D, having bent arms $d$, pivoted to said nut-bar F, and links D', pivoted to said nut-bar F', said bent arms $d$ resting upon the turn-table when the nuts F F' are screwed together near each other, thus giving a broad base for rigidly supporting the ladder in its elevated position, substantially as specified.

3. The combination, with a turn-table truck, of a right-and-left screw E, traveling nut-bars F F', ladder D, having bent arms $d$, pivoted to said nut-bar F, and links D' pivoted to said nut-bar F', said bent arms $d$ resting upon the turn-table when the nuts F F' are screwed together near each other, thus giving a broad base for rigidly supporting the ladder in its elevated position, and slotted guide-bars G, secured to the turn-table, substantially as set forth.

4. The combination, with a turn-table truck, of a right-and-left screw E, traveling nut-bars F F', ladder D, having bent arms $d$, pivoted to said nut-bar F, and links D', pivoted to said nut-bar F', said bent arms $d$ resting upon the turn-table when the nuts F F' are screwed together near each other, thus giving a broad base for rigidly supporting the ladder in its elevated position, and slotted guide-bars G secured to the turn-table, furnished with stop-blocks $g'$, substantially as specified.

5. The combination, with a turn-table truck, of a right-and-left screw E, traveling nut-bars F F', ladder D, having bent arms $d$, pivoted to said nut-bar F, and links D', pivoted to said nut-bar F', said bent arms $d$ resting upon the turn-table when the nuts F F' are screwed together near each other, thus giving a broad base for rigidly supporting the ladder in its elevated position, and slotted guide-bars G secured to the turn-table, furnished with stop-blocks $g'$, said traveling nut-bars F F' having friction-rollers $ff$, substantially as specified.

6. The combination, with a turn-table truck, of screw E, traveling nut-bar F, ladder D, pivoted to said nut-bar, and pivoted links D', said nut-bar F having removable journal-bolts $f^3$ extending through the side bars of the ladders, substantially as specified.

7. The combination, with a turn-table truck, of the driver's seat, standards R', secured rigidly to the turn-table, a screw, a traveling nut-bar, and a ladder pivoted to said traveling nut-bar, so that the act of raising the ladder moves the ladder away from the seat-standards, thereby permitting the ladder to be raised without removing the seat-standards, substantially as specified.

8. The combination of the main ladder and extension-ladder, the side bars of the latter fitting within and directly against the side bars of the former, friction-rollers countersunk in the ladder side bars for the meeting side faces of the ladder side bars to bear against, said friction-rollers projecting slightly beyond the surface of the side bars, so as to relieve the friction and at the same time permit the side bars to support each other and prevent extraordinary strain upon the pivots of the friction-rollers, and a ladder-extending cable traveling on pulleys the axes of which are parallel to the rungs of the ladder, substantially as specified.

9. The combination, in a turn-table having a truck-frame B, furnished with standards $B^2$, provided with hand ladder-supports $B^4$, the rear axle of said truck having a fifth-wheel connection with the truck-frame, and a removable steering-shaft extending up through the hand-ladders to hold them in place, substantially as specified.

10. The combination, in a turn-table truck having a truck-frame mounted upon fifth-wheels, of a steering mechanism, a removable steering-shaft T, a steering-wheel T', having a socketed shaft engaging the end of said steering-shaft and a pivoted frame V on which said steering-wheel is journaled, said pivoted frame V being pivoted to upright standards on one side of the truck-frame, so that it may be swung out of the way of the ladders when they are being raised, substantially as specified.

11. The combination, in a turn-table-truck, having a truck-frame mounted upon fifth-wheels, of a steering mechanism, a removable steering-shaft T, a steering-wheel T', having a socketed shaft engaging the end of said steering-shaft, and a pivoted frame V on which said steering-wheel is journaled, said pivoted frame V being pivoted to upright standards on one side of the truck-frame, so that it may be swung out of the way of the ladders when they are being raised, said pivoted frame V being furnished with a steersman's seat $V^2$, substantially as specified.

12. The combination, with a turn-table extension-ladder truck having a main ladder pivotally mounted on the turn-table, an extension-ladder sliding thereon above the rungs of the main ladder, and a screw raising mechanism, of water-pipes secured to the side bars of the main ladder, one on each side, under the rungs thereof and furnished with branches connecting the same at the top, said screw raising mechanism being mounted on the turn-table, so that the ladder and water-pipe may be raised to any elevation and poised in any direction desired, substantially as specified.

EVERETT B. PRESTON.

Witnesses:
H. M. MUNDAY,
EDMUND ADCOCK.